United States Patent [19]

Norton

[11] 4,407,023
[45] Oct. 4, 1983

[54] TWO-PIECE SNAP-TOGETHER FLOOR AND CEILING PLATE

[76] Inventor: C. W. Norton, 4032 Hampstead Rd., La Canada-Flintridge, Calif. 91011

[21] Appl. No.: 278,633

[22] Filed: Jun. 29, 1981

[51] Int. Cl.³ .......................... E03C 1/04; F16L 5/00
[52] U.S. Cl. ......................................... 4/191; 285/46; 285/193; 137/359
[58] Field of Search ................... 4/191, 661; 137/359; 285/45, 46, 193; 277/197

[56] References Cited

U.S. PATENT DOCUMENTS

| 230,040 | 7/1880 | Morey | 285/46 X |
|---|---|---|---|
| 453,461 | 6/1891 | Beaton | 285/46 X |
| 1,278,895 | 9/1918 | Farley | 285/46 X |
| 2,054,308 | 9/1936 | Tucker | 285/46 X |
| 2,743,461 | 5/1956 | Urbas | 4/191 |

FOREIGN PATENT DOCUMENTS 2413177 12/1974 Fed. Rep. of Germany .......... 4/191

Primary Examiner—Robert S. Ward, Jr.
Attorney, Agent, or Firm—Lyon & Lyon

[57] ABSTRACT

A device which is useful in providing a seal around passages wherein a pipe or other plumbing fixture enters a wall. The device has oppositely engageable identical sections which have semicircular notched portions substantially in the center thereof and adapted to be disposed about the pipe or plumbing fixture passing through the wall. Multiple clamping elements are provided to secure the oppositely positioned halves in a substantially parallel and aligned configuration.

2 Claims, 4 Drawing Figures

TWO-PIECE SNAP-TOGETHER FLOOR AND CEILING PLATE

BACKGROUND OF THE INVENTION

This invention relates to plumbing fixtures, and in particular those that are useful in providing a seal between the plumbing fixture and the wall through which it passes.

It has long been known that insects, vermin, or other animal life are present within the walls or underground structures of buildings or houses. If properly constructed, the walls of the houses or buildings should be impervious to passage of the aforementioned animals into the living quarters of the particular domicile or office quarters.

With the advent of indoor plumbing, however, the aforementioned insects or vermin have found it easy to pass through the walls of the building or house by simply passing through the holes through which the indoor plumbing or other fixtures pass. These man-made portals created both an unsafe and unsanitary condition by permitting the passage of animals of the aforementioned nature into the living quarters.

Furthermore, because of the problems caused by these vermin, insects and other animals, several public health ordinances now require the implementation of plumbing sealing devices.

Early attempts to solve this problem consisted of wrapping the pipe or fixture with a cloth before passing it through the portal cut in the wall. Because of the humidity found in most locations, the pipe would soon become moist, particularly if it was a cold water pipe, thereby dampening the cloth. After extended periods of time the cloth would decay, thereby creating both an unsightly and unsanitary condition. Moreover, mold was known to form on the wall at the location of these portals.

Other attempts to solve this problem illustrated a cuplike member comprising two pivotally attached sections, wherein the cup member had a hole defined substantially in the center thereof. To utilize this device, the plumber would rotate the dual sections away from each other thereby creating an access to the centrally disposed aperture. The plumber would then fit one-half of the cuplike member about the pipe and rotate the other half into connection therewith. This required the plumber to position one of the elements rigidly prior to rotating the other section into a connecting relationship therewith.

SUMMARY OF THE INVENTION

The invention of the present application solves many of the problems existent in these prior devices and methods.

Briefly, the invention of the present application consists of two semicircular sections each one having a semicircular notch defined substantially in the center thereof. Upon placing the two sections in a parallel alignment, the two semicircular notches form a substantially circular aperture in the center of the resulting disc-shaped object.

Each one of the semicircular sections also had a sleeve defined radially distant from the centrally disposed semicircular notch. Opposite the sleeve a flange extends outwardly from the opposing semicircular section and is adapted to fit within the aforementioned sleeve. A securing step is integral with the flange, whereby when the flange extends through the sleeve, it is held in place by having the inner wall of the sleeve juxtaposed the securing step.

A curved rib extends from one end of each semicircular section, so that when the semicircular sections are juxtaposed, the curved rib of each section will extend partially into the opposing semicircular section thereby creating the desired seal. The rib is integral with a downwardly extending wall portion of the semicircular section and is designed to fit within a notch defined within the opposing semicircular section.

In a second embodiment of the invention, each semicircular section is also identical in form. However, in this embodiment the curved rib extending from each semicircular section is not present and the notch defined in each semicircular section is absent.

It is therefore an object of the present invention to provide a plumbing sealing device which is useful in restricting the movement of vermin or insects from the interior of the walls of a house or building into the living quarters.

It is another object of the present invention to provide a plumbing sealing device which is easy to install, lightweight and inexpensive.

It is a further object of the present invention to provide a plumbing sealing device, which consists of dual opposing identical sections.

It is a further object of the present invention to provide a plumbing sealing device which may be disassembled into its principal components, thereby requiring less storage space than previous devices.

These and other objects, features, advantages, and characteristics of the present invention will be described in greater detail in the accompanying description, the appended claims and the drawings associated therewith, wherein:

BRIEF DESCRIPTION OF THE PREFERRED EMBODIMENT

Figure 1:
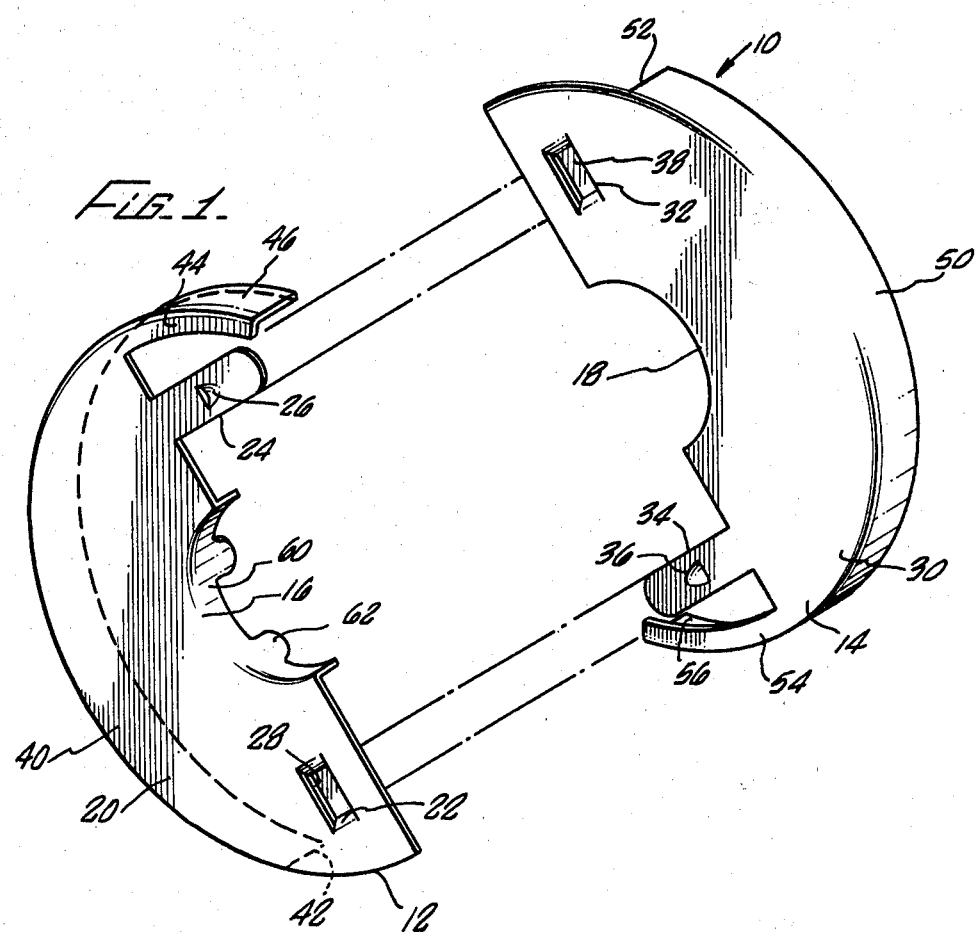
FIG. 1 is a exploded view of the plumbing sealing device of the present invention.
Figure 2:
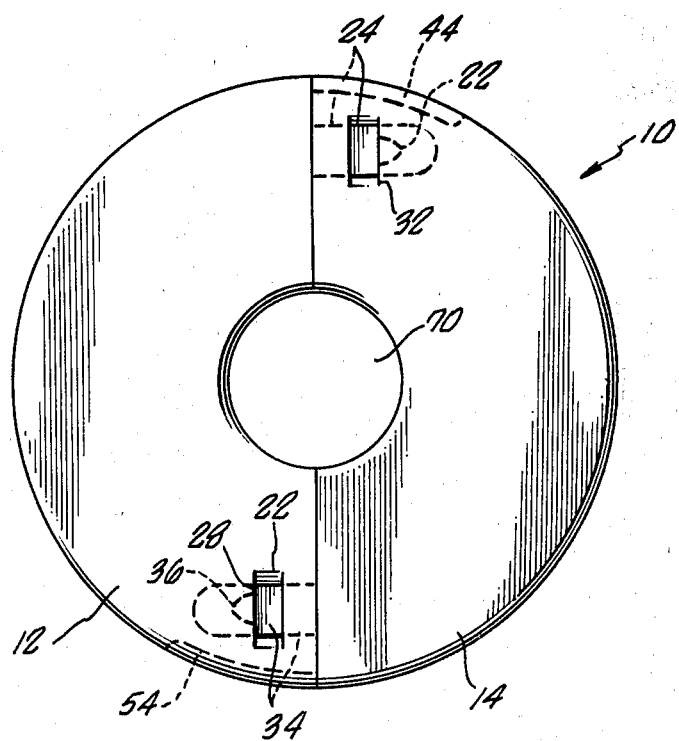
FIG. 2 is a front view of the present invention in its operative position.

A preferred embodiment of the plumbing sealing device of the present invention is shown generally in FIGS. 1 and 2 and identified with the numeral 10.

As illustrated in FIG. 1, in the exploded view the plumbing sealing device 10 consists of oppositely positioned semicircular sections 12, 14 which are identical in nature. The semicircular sections 12 and 14 define two semicircular notches 16, 18 substantially in the center of each semicircular section, respectively. Although in the preferred embodiment semicircular notches 16, 18 are defined in the sections 12, 14, it should be understood that other shapes may be formed.

Defined within the face 20 of the semicircular section 12 is a sleeve 22 which is useful in securing the semicircular sections 12 and 14 together. On the opposite side of the face 20 from the sleeve 22 is defined a flange 24 which extends outwardly from the face 20 and has a securing step 26 disposed along its length.

Along the face 30 of the opposing semicircular section 14 is a second sleeve 32 which is again adapted to affix the semicircular sections 12, 14 in an aligned continuous relationship. Opposite the sleeve 32 and extending outwardly from the face 30 is a second flange 34 which has a second securing step 36 extending outwardly therefrom, which is useful in securing the semicircular sections 12 and 14 together. The position of the flanges 24, 34 along the faces 20, 30 is designed such that the flanges 24, 34 may fit snugly within the sleeves 32, 22, respectively. The securing step 26 is disposed along the flange 24 such that when the flange 24 is placed within the sleeve 32 the securing step 26 will be adjuxtaposed the wall 38 of the sleeve 32. In this manner the flange 24 is rigidly secured within the sleeve 32. Similarly, the flange 34 will fit within the sleeve 22 in a manner that the second securing step 36 will be juxtaposed the wall 28 of the sleeve 22, thereby securing the flange 34 within the sleeve 22.

The securing of the flanges 24, 34 within the slots 32, 22 respectively is best illustrated in FIG. 2. It should also be apparent that although sleeves 22, 32 and flanges 24, 34 are shown in the preferred embodiment, other attachment means may be provided to secure the sections 12, 14 together.

Extending downwardly from the face 20 of the semicircular section 12 is a bent-over wall 40 which extends substantially along the entire periphery of the semicircular section 12 and is bent at a substantially right angle to the face 20. At the portion of the semicircular section 12 closest to the sleeve 22, the bent-over wall 40 will terminate, thereby defining a notch 42 in that portion of the semicircular section 12. On the other side of the semicircular section 12 a rib portion 44 is integral with the face 20 of the semicircular section 12 and has a downwardly extending substantially curved wall 46 integral therewith.

On the opposite semicircular section 14, a second bent-over wall 50 extends downwardly from the face 30 of the semicircular section 14 and is disposed at substantially right angles thereto. The wall 50 terminates at a point along the periphery at the face 30 thereby defining a notch 52 proximal to the sleeve 32. Opposite the notch 52 is a second rib portion 54 which has a downwardly extending wall 56 at substantially right angle thereto. The ribs 44 and 54 are integral with the faces 20, 30 of the semicircular section 12, 14 and extend in a curved manner outwardly therefrom.

Extending downwardly from the face 20 of the semicircular section 12 is a sealing wall 60 which extends the entire perimeter of the notch 16. A second sealing wall (not shown) extends downwardly along the entire periphery of the notch 18. The sealing wall 60 has multiple nipples 62 extending outwardly therefrom, which are adapted to assist in securing the sealing device 10 about the desired plumbing fixture. Although in the present configuration the nipples 62 are shown to be substantially semicircular in nature it should be apparent that other configurations may be possible such as spikes or squares depending upon the particular sealing that is to be performed.

It should also be apparent that although the walls 40 and 50 are shown to be at approximately right angles to the faces 20, 30, it is possible to orient those walls 40, 50 at different angles yet accomplish the same result. This is particular useful in some plumbing installations where matters of aesthetics are important. It should be further apparent that other sealing means such as rubber channels or gaskets may be provided at the walls 40, 50 to improve their sealing characteristics.

The plumbing sealing device 10 of the present invention is shown in its operative condition in FIG. 2. Briefly, the semicircular sections 12, 14 are drawn in a closer proximity, thereby completing the defining of an aperture 70 substantially in the center of the resulting combination of the semicircular sections 12 and 14. As indicated previously, when the sections 12, 14 are drawn together, the flange 34 will fit within the sleeve 22 such that the securing step 36 is juxtaposed the wall 28 of the sleeve 22. Similarly, the flange 24 will fit within the sleeve 32 such that the securing step 26 is juxtaposed the wall 38. In this manner the semicircular sections 12 and 14 are held rigidly together.

The outwardly extending rib 44 and downwardly extending wall 46 integral therewith will fit within the notch 52 defined within the semicircular section 14. Similarly, the outwardly extending rib 54 and downwardly extending wall 56 associated therewith will fit within the notch 42 defined within the semicircular section 12. In this manner a completely sealed disc is achievable about the particular plumbing fixture or pipe disposed through the wall of the house or other building.

Figure 3:
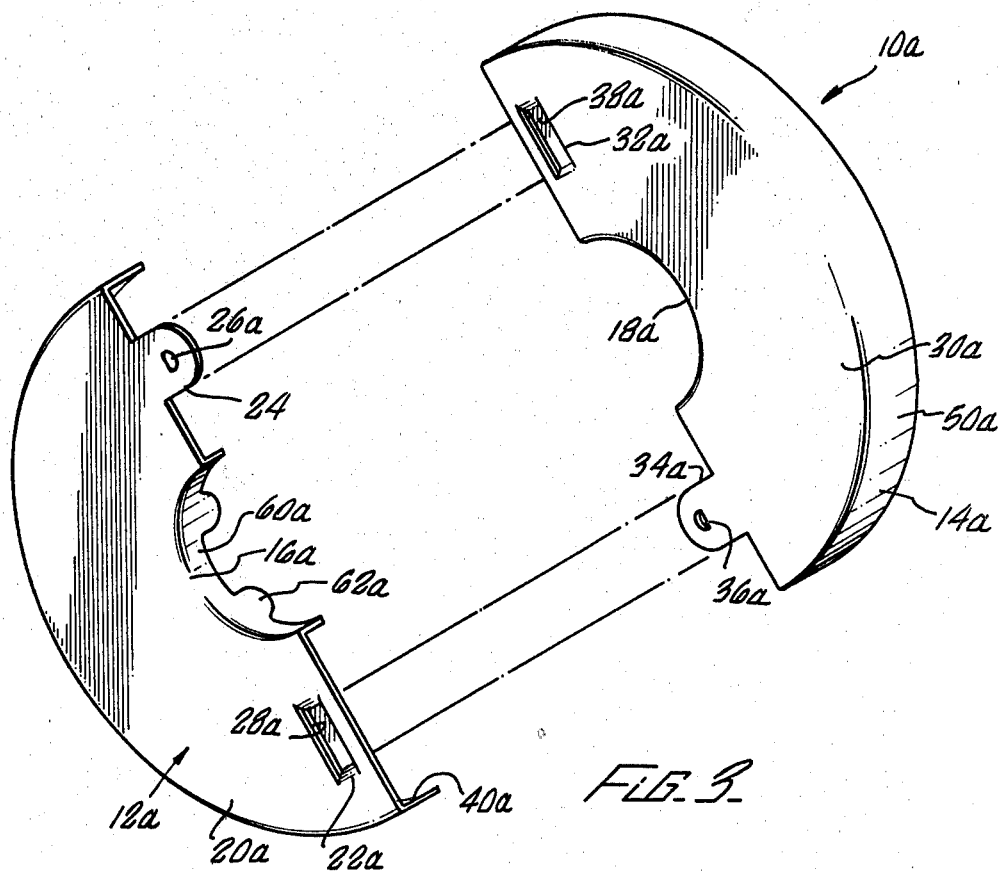
FIG. 3 is an exploded view of a second embodiment of the present invention.

The second embodiment of the present invention is shown in FIG. 3. As illustrated in FIG. 3, in the exploded view the plumbing sealing device 10a consists of oppositely positioned semi-circular sections 12a, 14a which are identical in nature. The semi-circular sections 12a and 14a define two semi-circular notches 16a, 18a substantially in the center of each semi-circular section, respectively.

Defined within the face 20a of the semi-circular section 12a is a sleeve 22a which is useful in securing the semi-circular sections 12a and 14a together. On the opposite side of the face 20a from the sleeve 22a is defined a flange 24a which extends outwardly from the face 20a and has a securing step 26a disposed along its length.

Figure 4:
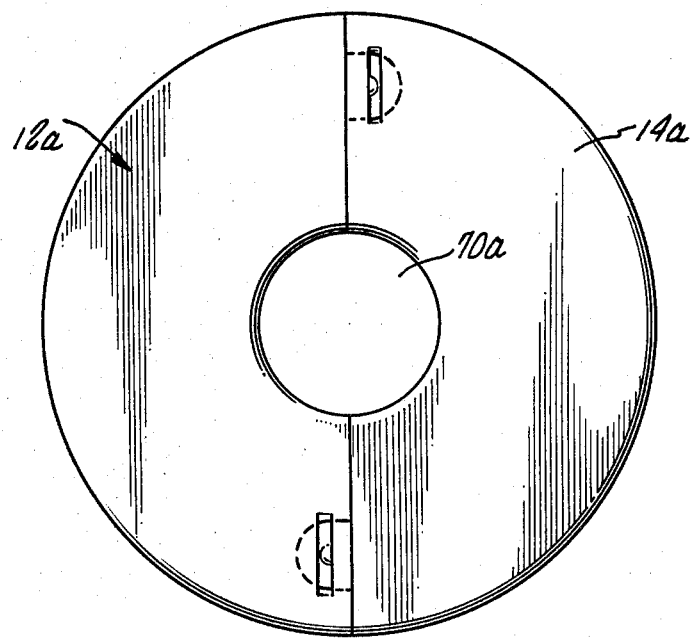
FIG. 4 is an exploded view of a second embodiment of the present invention.

Along the face 30a of the opposing semi-circular section 14a is a second valve 32a which is again adapted to afix the semi-circular sections 12a, 14a in an aligned continuous relationship. Opposite the sleeve 32a and extending outwardly from the face 30a is a second flange 34a which has a second securing step 36a extending outwardly therefrom, which is useful in securing the semi-circular sections 12a and 14a together. The position of the flanges 24a, 34a along the faces 20a, 30a is designed such that the flanges 24a, 34a may fit snugly within the sleeves 32a, 22a, respectively. The securing step 26a is disposed along the flange 24a such that when the flange 24a is placed within the sleeve 32a, the securing step 26a will be juxtaposed the wall 38a of the sleeve 32a. In this manner the flange 24a is rigidly secured within the sleeve 32a. Similarly, the flange 34a will fit snugly within the sleeve 22a in a manner that the second securing step 36a will be juxtaposed the wall 28a of the sleeve 22a, thereby securing the flange 34a within the sleeve 22a. The securing of the flanges 24a, 34a within the slots 32a, 22a, respectively is best illustrated in FIG. 4.

Extending downwardly from the face 20a of the semi-circular section 12a is a bent-over wall 40a which extends substantially along the entire periphery of the semi-circular section 12a and is bent at a substantial right angle to the face 20a. On the opposite semi-circular section 14a, a second bent-over wall 50a extends downwardly from the face 30a of the semi-circular section 14a and is disposed at a substantially right angle thereto.

Extending downwardly from the face 20a of the semi-circular section 12a is a sealing wall 60a which extends the entire perimeter of the notch 16a. The second sealing wall (not shown) extends downwardly along the entire periphery of the notch 18a. The sealing wall 60a has multiple nipples 62a extending outwardly therefrom, which are adapted to assist in securing the sealing device 10 about the desired plumbing fixture. Again, each semicircular section 12a, 14a is substantially identical to the other. However, in each case wall 40a or 50a extends entirely about the peripheral of section 12a, 14a, wherein no notch 42, 52 is defined. Similarly, the rib portions 44, 54 are absent.

In operation, the individual installing the present plumbing sealing device 10 will first fit one of the two sections 12, 14 about the particular pipe or plumbing fixture. By holding one of the semicircular sections 12, 14 in a rigid manner, whereby the notch 16, 18 is disposed partially about the pipe or plumbing fixture, the remaining semicircular section 12, 14 may be drawn into a closer proximity to the particular pipe or plumbing fixture. It is then possible to align the flange 24 with the sleeve 32 and the flange 34 with the sleeve 22 to occasion joining the present semicircular sections 12, 14, thus sealing the pipe or plumbing fixture within the aperture 70. By then pushing the joined sections 12, 14 into a close proximity with the wall (not shown) of the house or building, it is possible to seal the inner walls of the house or building from the living quarters. Similar installation techniques are utilized when the rib portions 44, 54 are absent as on the second embodiment.

The plumbing sealing device 10a of the present invention is shown in its operative condition in FIG. 4. Briefly, the semi-circular sections 12a, 14a are drawn in a closer proximity, thereby completing the defining of an aperture 70a substantially in the center of the resulting combination of the semi-circular sections 12a and 14a. As indicated previously, when the sections 12a, 14a are drawn together, the flange 34a will fit within the sleeve 22a such that the securing step 36a is juxtaposed the wall 28a of the sleeve 22a. Similarly, the flange 24a will fit within the sleeve 32a such that the securing step 26a is juxtaposed the wall 38a. In this manner, the semicircular sections 12a and 14a are held rigidly together.

In this manner it is made impossible for insects or other vermin to pass from the inner walls of the house or building into the living quarters through the access holes defined within the walls of the house, which are necessary to occasion passage of plumbing or other fixtures into the living quarters.

It should be apparent that the size of the hole 70 is variable in accordance with the diameter of the pipe or plumbing fixture to which it is to be used. Similarly, the aperture 70 may have various shapes in accordance with the particular geometry of the pipe or plumbing fixture with which it will be used.

Although the present plumbing sealing device 10 is made of stainless steel in the preferred embodiment, it should be noted that other materials, such as tin, zinc, cast iron or other materials may be used. Moreover, to accomplish desired decorative objectives, other shapes and materials may be used without departing from the spirit of the invention.

Furthermore, because each section 12, 14 is identical, it is extremely easy to manufacture the semicircular sections 12, 14 of the present invention and there is no need to have multiple dyes to perform the required stamping. In addition, because the semicircular sections 12, 14 can be separated, it is possible to store them in much less space than is required for a plumbing sealing device made up of components which are not detachable.

The plumbing sealing device 10 is primarily designed for use with plumbing fixtures which extend through the walls of a house or building. It should apparent however that the present device may also be utilized with electrical fixtures; however, in this instance it should be made of a non-conductive material.

The instant invention is shown and described herein in what is considered to be the most practical and preferred embodiment. It is recognized, however, that departures may be made therefrom within the scope of the invention and obvious modifications will occur to a person skilled in the art.

What is claimed is:

1. A plumbing sealing device, comprising:

oppositely positioned first and second separate sections, each of said sections having a notch defined substantially in the center thereof, each of said sections having a face portion, a downwardly extending wall integral with each of said face portions, said walls disposed at an angle to said face portions, a sleeve integral with each of said face portions of said sections, a flange extending outwardly from the face portion of each of said sections, a securing means integral with each of said flanges, whereby said flanges are adapted to fit within said sleeves defined in said face portions to occasion connection of said first and second sections.

2. A plumbing sealing device for use in sealing the walls of a room through which plumbing fixtures are disposed, said device comprising, a first semicircular section having a face portion, a sleeve defined within said face portion, a wall integral with said face portion and extending downwardly from said face portion at an angle thereto, a notch defined within said face portion, a second wall integral with said face portion and extending downwardly from said face portion along the periphery of said notch, a flange extending outwardly from said face portion and a securing means integral with said flange, a second substantially identical semicircular section, whereby rotation of said second semicircular section 180 degrees from said first semicircular section permits adjuxtaposition of said first and second semicircular sections to form a substantially disc-shaped object upon passage of said flange of said first section through said sleeve of said second section and passage of said flange of said second section through said sleeve of said first section.

* * * * *